United States Patent [19]
Elliott

[11] 3,912,002
[45] Oct. 14, 1975

[54] HEAT EXCHANGER

[75] Inventor: Douglas Ernest Elliott, Sutton Coldfield, England

[73] Assignee: Fluidfire Development Limited, Worcestershire, England

[22] Filed: Oct. 13, 1972

[21] Appl. No.: 297,368

[52] U.S. Cl. ............... 165/104; 122/4 D; 165/104; 165/107
[51] Int. Cl. ........................................... F28d 13/00
[58] Field of Search ............... 165/104; 122/4 D; 23/288 S; 34/57 A

[56] References Cited
UNITED STATES PATENTS

| | | | |
|---|---|---|---|
| 2,185,929 | 1/1940 | Simpson et al. | 165/104 X |
| 2,665,971 | 1/1954 | Lewis et al. | 23/288 S X |
| 3,372,742 | 3/1968 | Forner | 165/104 X |
| 3,512,577 | 5/1970 | Javorsky | 165/104 X |
| 3,645,237 | 4/1972 | Seth | 165/104 X |

Primary Examiner—Albert W. Davis, Jr.
Attorney, Agent, or Firm—Holman & Stern

[57] ABSTRACT

A heat exchanger in which there is provided a bed of solid particles through which a gas is passed to fluidize the bed, and a finned tube which is immersed in the bed. The bed is relatively shallow, typically not more than 4 inches deep. Heat is transferred through the intermediary of the solid particles between the gas and a further fluid within the tube. In one embodiment, the bed is supported on the inner surface of a rotating perforate drum through which the gas flows in a radially inward direction to fluidize the bed.

18 Claims, 7 Drawing Figures

HEAT EXCHANGER

BACKGROUND OF THE INVENTION.

This invention relates to heat exchangers comprising a bed of particles through which a gas is passed in such a manner as to fluidize the bed, and a thermally conductive wall structure arranged to be contacted on one side by a further fluid and on the other side by the particles. Heat can be transferred between the gas and the further fluid (which may be liquid or gaseous), in which case the heat is transferred through the intermediary of the particles and the wall structure. Alternatively, heat may be transferred between the solid particles and the further fluid, in which case the gas is recirculated through the bed merely to fluidize the latter and the particles are caused to flow across the bed from an inlet to an outlet.

PRIOR ART

In one known form of heat exchanger of the kind referred to, with the thermally conductive wall structure comprises a bundle of cylindrical metal tubes, the tubes extending horizontally through the bed. By the term "a bundle" is meant an array of tubes wherein the tubes are spaced apart vertically and horizontally so that the bundle comprises several layers of tubes, the layers being one above the other and each layer containing several tubes which lie side by side.

In order to keep the cost of a heat exchanger required for a particular duty as low as possible, it is desirable to reduce the size of the apparatus while maintaining the required heat transfer capacity. In conventional heat exchangers, that is to say heat exchangers in which the gaseous fluid is passed over tubes through which the further fluid flows, there being no fluidized bed of particles present, reduced overall size can be achieved by employing extended surface tubes, i.e. tubes having fins or like projections. However, the use of extended surface tubes generally increases the pressure drop in the gaseous fluid passing through the heat exchanger.

A heat exchanger of the kind referred to wherein the thermally conductive wall structure is in the form of a bundle of finned tubes has been constructed, and some improvement in the capacity for heat transfer, as compared with that obtained with a similarly sized bundle of unfinned tubes, was obtained.

It has now been discovered that the capacity for heat transfer can be further improved by a modification of the arrangement of the tubes and fluidised bed.

SUMMARY OF THE INVENTION

According to the present invention there is provided a heat exchanger comprising a bed of solid particles, distributor means for supporting the bed, for admitting a gas thereto and for distributing the gas throughout the bed, and at least one extended surface tube, at least a part of which tube lies in the bed, wherein the depth of the bed, at least when the heat exchanger is operating, and measured from a surface of the bed which is in contact with the distributor means to an opposite surface, is not greater than 6 inches.

The relatively shallow bed of a heat exchanger in accordance with the present invention, as compared with beds provided in known heat exchangers of the type referred to, permits a considerably greater rate of heat transfer per unit area of tube surface than is obtained under similar conditions with a relatively deep bed.

The reasons for this effect are not fully understood, since there is very little variation in temperature between one part of the deep bed and another part when the known form of heat exchanger of the kind specified is operating, and therefore all tubes of a bundle are subjected to substantially the same temperature differential. However, it is believed that the smaller pressure differential between the top and bottom of the relatively shallow bed is a contributory factor, since the small bubbles of the gaseous fluid present at the bottom of the bed do not reach such a large size in the relatively shallow bed as they do in a deeper bed. In a deep bed with finned tubes, bubbles may reach such a size that they extend completely across a space between adjacent fins, thus reducing the extent of contact between the fins and particles of the bed.

In some cases, it may be desirable to maintain a temperature differential between different parts of a bed, or to arrange for transfer of heat from the particles of the bed to the tube at different rate within different parts of the bed. For example, in a case where a fluid is passed along the tube and heated therein, the temperature of the fluid will be lower at one end of the tube than it is at the other. In order to provide for efficient transfer of heat to the fluid, it is desirable that the temperature of the bed should vary from one end of the tube to the other, so that the tube is subjected to a temperature differential which is approximately uniform along the entire length of the tube. In order to avoid excessive thermal stresses in the tube, it may be desirable to reduce the rate of heat flow from the particles to one part of the tube, as compared with another part of the tube.

To achieve these objectives, the tube may be provided with fins or other projections, the spacing between which varies from one part of the bed to another. Alternatively, a plurality of extended surface tubes may be provided in the bed, with the tubes being disposed closer to one another in one part of the bed than in a further part of the bed.

That part of the bed in which the tubes or fins are spaced further apart would automatically maintain itself at a higher temperature than that part of the bed in which the tubes or fins are closer together, with such temperature difference within the shallow bed being possible; whereas in a relatively deeper bed of particles, intermixing of particles from various parts of the bed prevents the establishment of such a temperature difference.

In one advantageous embodiment of the present invention, the distributor means is in the form of a rotatable drum and the bed is disposed, at least when the heat exchanger is operating, on the inwardly presented face of the drum. The fluidizing gas is caused to flow in a radially inward direction through the drum and bed to fluidize the latter.

When the drum is rotating and carrying the bed on its inwardly presented face, the centrifugal force to which the particles are subjected opposes movement of the particles in a radially inward direction with the flow of the gas through the bed. Thus, the gas can be caused to flow through the bed at speeds in the region of 10 or even 20 feet per second, provided that the drum is rotated at a sufficiently high speed to prevent the particles being carried from the bed with the flow of gas.

Generally, this arrangement enables a higher gas flow rate and smaller particles to be used, as compared with a gravitational bed. Thus, a large volume of air can be passed in a given time through a heat exchanger of relatively small size. Alternatively, the particles of which the bed is composed may be much smaller than the smallest particles of similar material which could be employed in a gravitational bed through which a gaseous fluid is passed at a similar speed. Such smaller particles enable higher heat transfer coefficients to be achieved than is the case when larger particles are used in comparable circumstances.

If particles smaller than those employed in gravitational beds are used, finned tubes wherein the fin spacing is closer than that which can be used in a gravitational bed can be employed without any appreciable increase in the risk of particles bridging over between the fins and thus interfering with heat transfer. The provision of finned tubes with close fin spacing enables a greater area of heat transfer surface to be included in a given volume of bed, and accordingly it will be possible to achieve the required rate of heat transfer without using a bed depth so great that the pressure drop through the bed will be excessive.

DETAILED DESCRIPTION OF THE EMBODIMENTS

Figure 1:
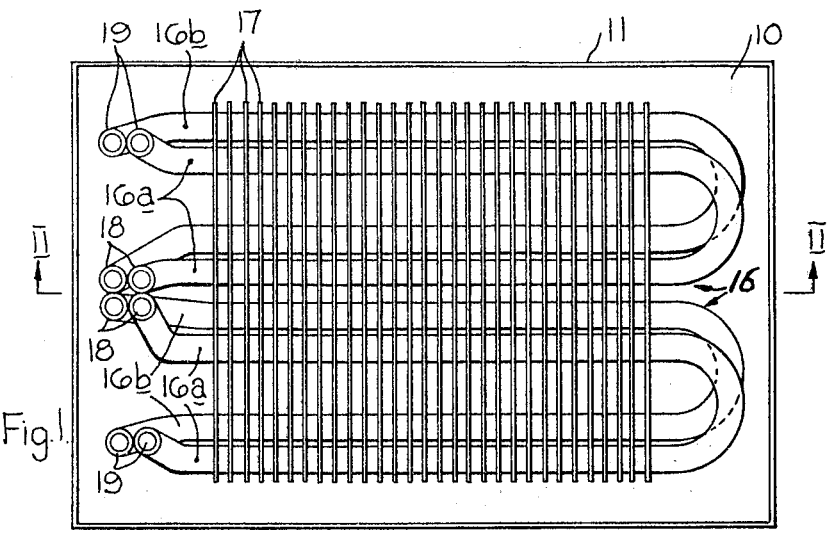
FIG. 1 shows a plan view of one form of heat exchanger in accordance with the invention.
Figure 2:
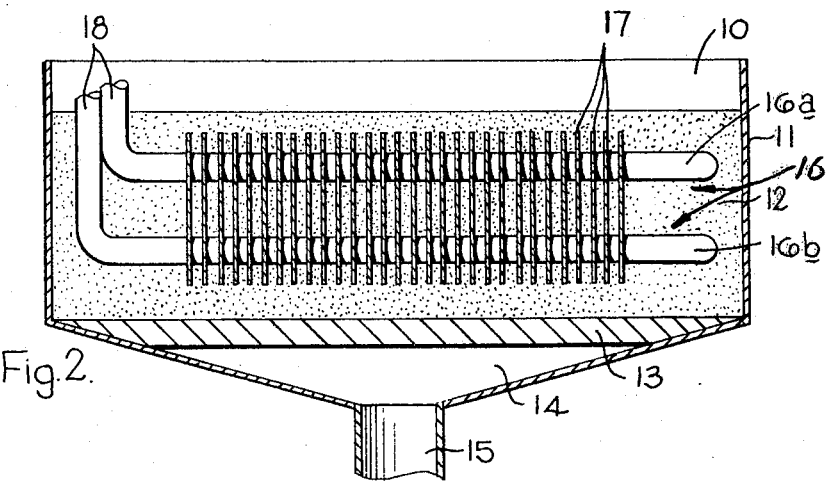
FIG. 2 is a view in cross-section on the line II—II of FIG. 1, the view looking in the direction of the arrows.

The heat exchanger shown in FIGS. 1 and 2 includes an upper chamber 10 which is enclosed by a side wall 11 and is of rectangular shape when viewed in plan. Within the upper chamber 10 there is disposed a bed 12 of particles which may be of a refractory material, for example sand. The bed is supported on a distributor plate 13 which separates the upper chamber from a lower chamber 14, and closes the bottom of the upper chamber with respect to passage therefrom of the particles of which the bed is composed. The distributor plate 13 is adapted to admit gas to the bed 12 and to distribute such gas throughout the entire area of the bed.

In the heat exchanger shown in FIGS. 1 and 2, the distributor plate 13 is a steel plate formed with perforations of such a size that the particles of which the bed 12 is composed cannot pass therethrough. Alternative forms of distributor plate which may be employed are a plate of porous ceramic material, and a plate of sintered metal particles.

The lower chamber 14 tapers downwardly from the distributor plate 13 to a central gas inlet 15. Vanes or baffles may be provided in the lower chamber to ensure that the gas flow is distributed evenly to all parts of the plate 13. If required, the lower chamber may be provided with a floor which slopes to a point from which a narrow by-pass tube leads to the upper chamber 10. Any particles which fall from the bed 12 through the distributor plate when the heat exchanger is not operating would then be carried through the by-pass pipe to the upper chamber when the heat exchanger is brought into operation and gas is caused to flow into the lower chamber through the gas inlet. Means could be provided to close the by-pass tube after a brief period during which all particles which have collected in the lower chamber will have been returned to the upper chamber.

The heat exchanger further comprises a plurality of finned tubes 16 which are immersed in the bed 12. In the particular example shown in FIGS. 1 and 2, there are two layers of tubes indicated at 16a and 16b respectively. The tubes of the upper layer are arranged above the spaces between tubes of the lower layer. The tubes are provided with common fins 17, with each fin being of rectangular shape and being formed with a number of apertures corresponding to the number of tubes so that each of the tubes passes through an aperture in each of the fins. The tubes 16 and fins 17 are formed of thermally conductive material, for example copper or aluminium. The tubes are arranged to be in good thermal contact with the fins. Each tube may be a force fit within the corresponding aperture of each fin. Alternatively, the fins could be brazed to or otherwise united with the tubes.

Inlets and outlets 18 and 19 respectively communicate with the tubes 16, and the inlets and outlets extend from the tubes upwardly through the top of the chamber 10.

In the heat exchanger shown in FIG. 1, the tubes 16 have a diameter of approximately ¼ inch, and each fin 17 has a length of approximately 5 inches and a depth of approximately 2 inches. Typically, the fins are spaced ⅛ inch apart. The upper chamber 10 typically has a length of approximately 9½ inches and a width of approximately 6 inches. The depth of the bed 12 is 3 inches. It will be seen that the lower layer of tubes 16b is spaced less than 2 inches, in particular approximately 1 inch, from the interface between the bed 12 and the distributor plate 13. It will be noted that the lower edges of the fins 17 are spaced somewhat from the upper face of the distributor plate 13. It will also be noted that the upper edges of the fins are spaced somewhat below the upper surface of the bed. It will also be noted that the spacing between the upper layer of tubes 16a and the lower layer of tubes 16b is less than the average spacing of the tubes within either of these layers. Thus, a greater part of the fin area from which each tube receives heat is situated beside the tube than is situated above or below the tube. This arrangement gives a better heat transfer coefficient when the fluidizing gas is flowing upwardly, than would otherwise be achieved. The thickness of the fins 17 is selected according to the required rate of heat flow within the fins, and may typically be 14 s.w.g. The fins may be thicker adjacent to the tubes and thinner at positions remote from the tubes.

One application which is envisaged for the heat exchanger shown in FIGS. 1 and 2 is that of recovery of heat from the exhaust of an internal combustion engine. A considerable proportion of the heat released by combustion of the fuel in such an engine is carried out of the engine by the exhaust gases. It is desirable to recover at least some of this heat energy in order to improve the overall operating efficiency of the engine. Furthermore, in some cases the emission of exhaust gases at high temperatures cannot be tolerated, and this problem is especially important in the case of gas turbine engines where it is frequently necessary to extract heat from the exhaust gases simply to avoid emission of very hot gas. It is further desirable that any heat exchanger used for recovering heat from the exhaust of a gas turbine plant or other internal combustion engine should offer a low resistance to the flow of the exhaust gases therethrough.

The shallow bed of the heat exchanger shown in FIGS. 1 and 2 offers a relatively low resistance to the flow of gas therethrough, and if the exhaust gas from an internal combustion engine is passed through the heat exchanger, the gas is subjected to only a low pressure drop. The exhaust gas would be conveyed from the engine along a duct to the gas inlet 15, and would be conveyed along a further duct (not shown) from the upper end of the chamber 10 to be discharged into the atmosphere at a suitable position. Water or some other coolant would be passed through the tubes 16 and would thereby be heated.

The heat exchanger may be used to transfer heat from the exhaust gas to water within the tubes 16 so that such water is boiled, with the steam thus produced being used to drive an electric generator. In a case where it is necessary to extract heat from the exhaust gases without diluting them and where the heat is not required to be converted into a useful form of energy, the water heated in the tubes 16 may be circulated to an air-cooled heat exchanger so that the heat is eventually transferred to the atmosphere.

A further advantage which arises when the exhaust gas from an internal combustion engine is passed through the bed of the heat exchanger shown in FIGS. 1 and 2, is that the emission of noise from the engine is reduced considerably. A still further advantage is that the bed helps to reduce pollution by trapping a portion of the carbon which is normally present in exhaust gases produced by burning a hydrocarbon fuel, and which would otherwise be released to the atmosphere with the exhaust gas, with such carbon being deposited on the particles of the bed. The bed may be so arranged that a part of the bed has no tubes running therethrough, in which case this part of the bed would attain a higher temperature than the remainder of the bed, and the deposited carbon would be burnt off the particles as they circulate into this part of the bed.

Figure 7:
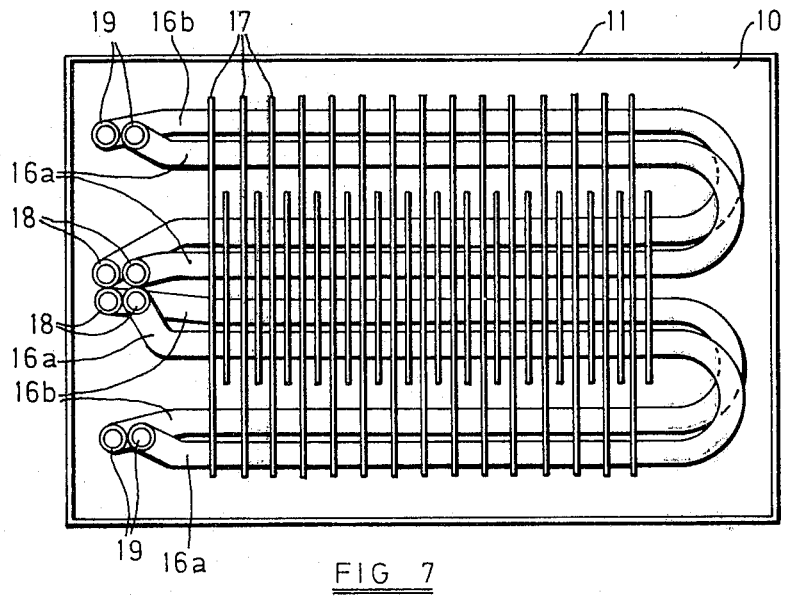
FIG. 7 is a view similar to FIG. 1 illustrating a further modification of the heat exchanger of FIG. 1.

The heat exchanger shown in FIG. 1 and 2 may also be used to recover heat from the exhaust gases produced in boilers, incinerators or other combustion systems which emit a hot gas. In such a case, the hot gas would be passed into the heat exchanger through the gas inlet 15, and water or steam to be heated in the heat exchanger would be passed through the tubes 16. Since the water or steam would be heated gradually as it flows along one of the tubes 16, it may be desirable to maintain a part of the bed at a temperature higher than that of a further part of the bed, so that the temperature differential across the wall of the tube will be substantially uniform along the entire length of the tube. This can be achieved by varying the fin spacing or tube spacing from one part of the bed to another, with that part of the bed in which the fins or tubes are more widely spaced automatically being maintained at a somewhat higher temperature than the remainder of the bed. It will be seen in FIG. 7 that in each layer both the spacing between adjacent parallel parts of the tubes and the fin spacing are smaller near to the middle of the heat exchanger, i.e. adjacent to the inlets 18, and are greater near to the sides of the heat exchanger, i.e. adjacent to the outlets 19. Migration of particles from one part of the bed to another is somewhat restricted by the fins 17 and by the relatively small depth of the bed, so that differences of temperature between different parts of the bed can be maintained; whereas in a deep bed this would not be possible owing to the free migration of particles between different parts of the bed.

Two or more heat exchangers as shown in FIGS. 1 and 2 may be connected in series so that hot gases from which heat is to be recovered pass firstly through the bed of one heat exchanger and then through the bed of a further heat exchanger. The tubes 16 of the two or more heat exchangers may be connected in series or in parallel with one another.

The heat exchanger may also be used to transfer heat from a fluid within the tubes 16 to a gas which is passed through the bed. Thus, the heat exchanger may be used as a condenser, steam being fed to the tubes 16 and ambient air being caused to flow through the bed to cool the tubes and thereby condense the steam therein.

Figure 3:
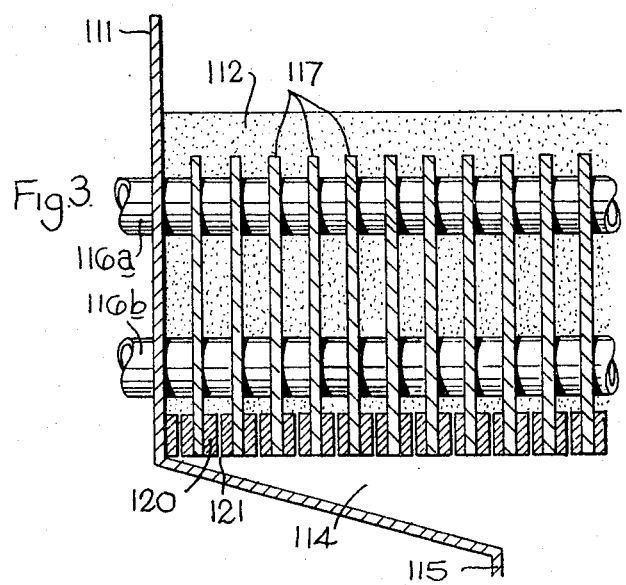
FIG. 3 is a fragmentary sectional view similar to FIG. 2 and on an enlarged scale relative thereto, illustrating a modification of the heat exchanger shown in FIGS. 1 and 2.

In FIG. 3 there is illustrated a modification of the heat exchanger shown in FIGS. 1 and 2. Parts shown in FIG. 3 corresponding to those already described with reference to FIGS. 1 and 2 are indicated by like reference numerals with the prefix 1, and the preceding description is deemed to apply thereto.

In the modification of FIG. 3, the distributor means comprises ribs 120 formed on the fins 117 along the lower edges thereof, with the ribs of one fin projecting towards those of the adjacent fins on either side. A narrow aperture 121 is defined between each pair of adjacent ribs, and the width of these apertures is less than the diameter of the particles of which the bed 112 is composed. Thus, the ribs 120 are adapted to support the bed, and to permit a gas to flow from the lower chamber 114 through the apertures 121 into the bed.

Typically, the width of the apertures 121 is within the range 4 to 8 thousandths of an inch. To maintain this spacing, shim spacers of the appropriate thickness may be brazed between adjacent ribs 120 adjacent to the ends of the fins 117.

The particles of which the bed is composed may be silica sand. In cases where the gas is required to be passed through the bed at a rate such that particles of sand would be carried from the bed by the gas stream, particles of a more dense material such as rutile or zircon sand may be employed. The particles may alternatively be steel microshot.

In one experiment with a heat exchanger as shown in FIGS. 1 and 2 and a bed composed of particles of zircon of 150 microns diameter, a gas was passed through the bed at a rate of 1.29 feet per second, and an outside heat transfer coefficient of between 111 and 116 b.t.u.

per square foot per hour per degree Fahrenheit was achieved and enabled 8.25 kilowatts of heat to be recovered from an exhaust gas which was passed through the heat exchanger. In a further experiment using the heat exchanger shown in FIGS. 1 and 2 and a bed composed of steel shot of 350 microns diameter, the exhaust gas was passed through the bed at a velocity of 2.38 feet per second and an outside heat transfer coefficient of 40 b.t.u. per square foot per hour per degree Fahrenheit was obtained, with the relatively higher gas temperature and velocity enabling 11.6 kilowatts of heat to be recovered.

Preferably the spacing between adjacent fins is at least five times the maximum size of particles in the bed. In a case where the fin spacing is small, say up to 2 millimeters, the depth of the bed is preferably in the region of 2 inches. When the fin spacing is greater, the bed depth can be greater, typically up to 4 inches. Bed depths of up to 6 inches may be employed, but with bed depths greater than 6 inches, it has been found that the heat transfer coefficient is substantially reduced. Also, shallow beds, i.e. having depths not greater than 6 inches, can be operated with a fairly low pressure drop, typically within the range 3 to 10 inches water gauge, depending upon the nature of the distributor, of the particles of which the bed is composed, and the velocity of the fluidizing gas. Pressure drops within this range are sufficiently low for the heat exchanger to have a negligible effect on the performance of a modern diesel or gas turbine engine when the exhaust therefrom is passed through the heat exchanger.

It will be appreciated that with a heat exchanger as shown in FIGS. 1 and 2, the rate of flow of the gas through the bed must be limited to a range below that rate which is sufficient to enable the gas to carry particles completely out of the bed or out of the upper chamber. Upward movement of the particles is resisted only by gravity, and such resistance therefore depends upon the weight of the particles concerned. In order to obtain high transfer coefficients and to enable closely spaced fins to be used, particles of small size are advantageous. In a case where the bed is formed of particles of silica sand, the fluidizing gas is generally passed through the bed at a speed within the range 1 to 4 feet per second. If particles of denser material, for example zircon sand, rutile or steel microshot are employed, higher gas velocities up to 10 feet per second can be used.

The problem of the limitation of gas velocity within the bed is especially acute in cases where the heat exchanger is employed as an air cooling unit wherein ambient air is passed through the bed of particles to absorb heat from a fluid contained within the tubes, with this fluid being at a temperature only moderately higher, say 50°C higher, than the ambient temperature. In such circumstances, air must be passed through the heat exchanger at a high rate and the volume of a heat exchanger as shown in FIGS. 1 and 2 and appropriate to such a duty, may be inconveniently large.

Figure 4:
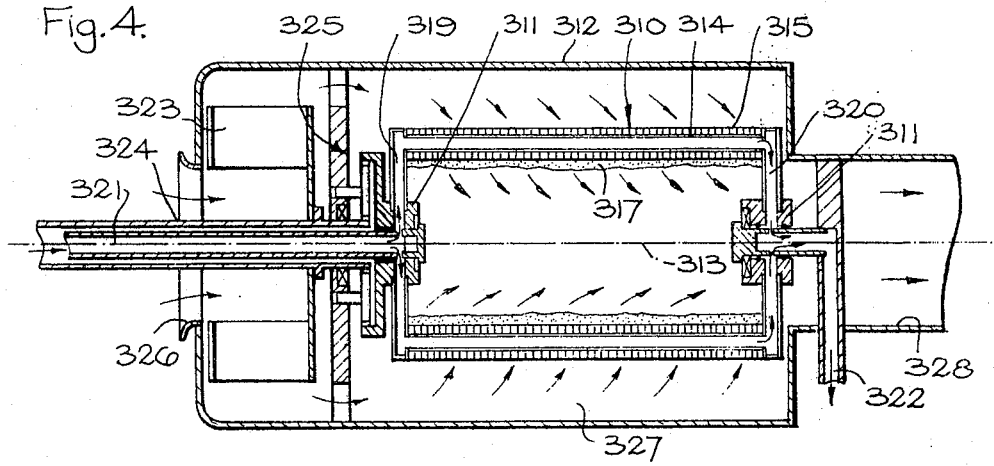
FIG. 4 is a view in diametral cross-section of a further form of heat exchanger wherein a bed of particles is supported on the inwardly presented face of a rotatable drum.
Figure 5:
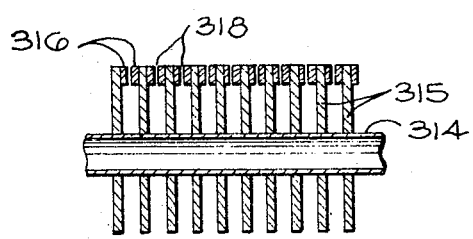
FIG. 5 is a fragmentary view on an enlarged scale relative to FIG. 4 illustrating in greater detail the construction of the drum thereof.

In FIGS. 4 and 5 there is illustrated a further form of heat exchanger in accordance with the present invention which is capable of operating satisfactorily with the fluidizing gas passing through the bed at a higher speed than is practicable with a heat exchanger as shown in FIGS. 1 and 2. The heat exchanger comprises a drum indicated generally at 310 mounted by means of bearings 311 in a casing 312 for rotation relative thereto about an axis 313. As shown in the drawings, the axis 313 is horizontal.

The drum 310 comprises a plurality of tubes 314 which extend parallel to the axis 313, are spaced from each other circumferentially of the drum and are positioned near to the periphery thereof. The tubes are connected with one another by a plurality of fins 315, the fins each being of annular form and being formed with a number of openings equal to the number of tubes 314 so that each tube passes through an opening in each fin. Each fin is formed on both of its faces which are presented towards adjacent fins, and at a position adjacent to the outer periphery of the fin, with a rib 316 which extends completely around the periphery of the drum. The ribs collectively constitute a distributor means for supporting a bed 317 of solid particles on the inwardly presented face of the drum. Openings 318 through which gas can enter the drum are defined between adjacent ribs, with the width of these openings being less than the diameter of the particles of which the bed is composed. The spacing between the ribs is maintained by spacer shims which are brazed between adjacent ribs at intervals around the periphery of the drum.

Preferably, and as shown in FIG. 4, there is a single layer of tubes 314 around the periphery of the drum 310. As shown in FIG. 4, when the heat exchanger is operating, the tubes 314 and fins 315 are completely immersed in the bed 317. The depth of the bed is typically 2 inches, and is preferably less than 3 inches. The particles of the bed may consist of one of the various materials hereinbefore mentioned. Typically, the fins 315 are spaced approximately 1/10 of an inch apart. It will be seen that the tubes 314 are spaced less than 1 inch, in particular approximately ½ inch, from the interface between the bed 317 and the distributor means.

The tubes 314 are connected in parallel with one another and communicate with inlet and outlet header chambers 319 and 320 respectively, which are provided at opposite ends of the drum 310. The header chambers are connected by means of joints which provide for relative rotation with a fixed inlet pipe 321 and a fixed outlet pipe 322 respectively.

At the end of the drum adjacent to the inlet pipe 321 there is provided an air impeller 323 which is mounted for rotation about the axis 313. The impeller is mounted on a hollow drive shaft 324 which is mounted concentrically with the inlet pipe 321 and means (not shown) such as a belt and pulley drive is provided for driving the shaft from a motor. An epicyclic reduction gearbox 325 is provided to transmit drive from the shaft 324 to the drum 310, so that the drum will rotate at a lower speed than that of the impeller 323. Typically, the drum would rotate at 1/10 the speed of the impeller.

The casing 312 encloses the impeller 323 and defines an axial air inlet 326 adjacent to the impeller. The casing has a diameter considerably greater than that of the drum 310 so that an annular passageway 327 is defined between the periphery of the drum and the interior of the casing. The casing also defines an axial air outlet at the end of the casing remote from the inlet 326.

The end of the drum adjacent to the air inlet 326 is closed and the end of the drum adjacent to the air outlet 328 is formed with openings through which air can flow from the interior of the drum through the air outlet. When the heat exchanger is operating, air is caused to flow from the inlet 326 to the annular passageway 327 and thence through the openings 318 and the bed 317 to the interior of the drum from where it flows to the air outlet. The flow of air in the radially inward direction through the bed causes the latter to be fluidized, while the centrifugal effect of rotation of the drum tends to throw the particles radially outwardly against the ribs 316.

Provided that the drum 310 is rotated sufficiently rapidly, the heat exchanger shown in FIG. 4 can be operated with a gas velocity through the bed 317 within the range 10 to 20 feet per second.

It is envisaged that the heat exchanger shown in FIG. 4 will be used as a condenser for steam. In this application, steam is fed to the heat exchanger through the inlet pipe 321 and is distributed through the inlet header 319 to the tubes 314 which conduct heat from the steam to the particles of which the bed 317 is composed. The steam condenses and water is drained from the heat exchanger through the outlet header 320 and outlet pipe 322. Ambient air is forced through the bed 317 to extract heat from the particles thereof.

Figure 6:
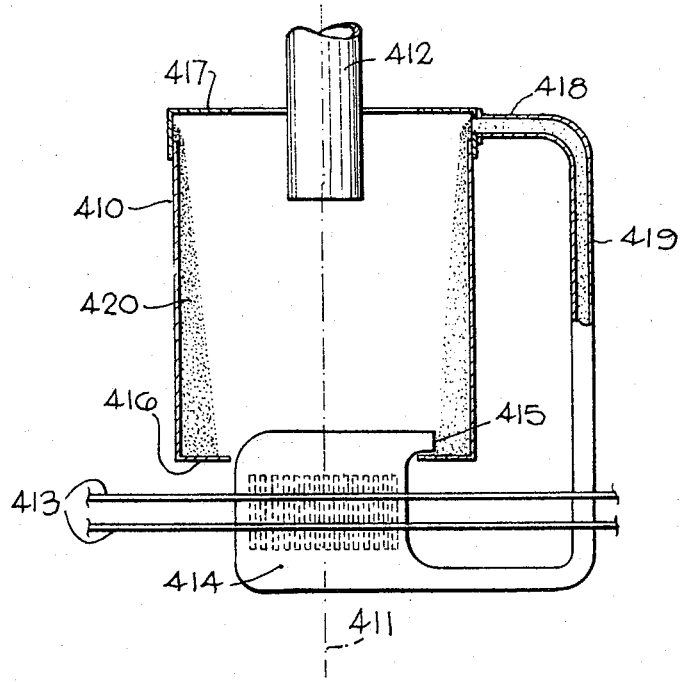
FIG. 6 is a diagrammatic illustration of a further form of heat exchanger wherein the bed of particles is supported on the inwardly presented face of a rotatable drum.

In FIG. 6 there is illustrated diagrammatically a further heat exchanger wherein a bed of particles is supported on the inwardly presented face of a rotatable drum. A perforate drum 410 is mounted by means of bearings (not shown) for rotation about a vertical axis 411.

Means is provided for causing air to flow into the drum from the periphery thereof. Such means may comprise an air outlet duct 412 which extends from the interior of the drum through the upper end thereof. The outlet duct would be connected with a fan or other means for drawing air from the drum. With this arrangement, the radially outwardly presented face of the drum may be open to the atmosphere. Alternatively, suitable duct means could be provided to convey air from a fan or the like to the periphery of the drum, in which case the upper end of the drum may be open.

The heat exchanger shown in FIG. 6 further comprises finned tubes 413 which are disposed beneath the lower end of the drum 410. These tubes are enclosed in a housing 414 having an outlet 415 which is directed towards the inwardly facing surface of the drum 410 at a position spaced slightly above the lower end thereof.

At its lower end, the drum 410 includes a radially inwardly extending flange 416 which co-operates with the housing 414 substantially to close the lower end of the drum. At the upper end of the drum there is fixedly mounted a shield 417 of part-annular form which extends radially inwardly from the periphery of the drum.

A receiver 418 is disposed at the outside of the drum 410 adjacent to the gap between opposite ends of the part-annular shield 417. The receiver is connected by a vertical duct 419 with the housing 414 at a position below the tubes 413.

The duct 419 and housing 414 are filled with particles, and the drum 410 contains a further quantity of such particles. When the drum is rotated, the particles therein form a layer or bed 420 which will completely cover the inwardly presented surface of the drum. As shown in the drawings such bed will taper upwardly.

When air is drawn into the drum from the periphery thereof, as previously described, the bed 420 will be fluidized and particles will tend to flow upwardly, thus reducing the difference between the thickness of the bed adjacent the lower end of the drum and the thickness of the bed adjacent the upper end. At the upper end of the drum, such upward flow of the particles which constitute the bed 420 will be arrested by the shield 417, excepting for those particles which arrive at the gap between the ends of the shield. These particles will pass over the upper end of the drum and radially outwardly into the receiver 418.

The column of particles contained in the duct 419 will subject the particles within the housing 414 to sufficient pressure to cause particles to flow from the housing through the outlet 415 into the bed 420. Thus circulation of the particles from the bed, over the tubes 413 and back to the bed will be established.

Water or other fluid which is required to be cooled would be passed through the tubes 413 where heat would be transferred to the particles within the housing 414. These particles would then be cooled by incoming air when they occupy the bed 420, so that heat removed from the fluid within the tubes 413 would eventually be transferred to the air.

If required, means may be provided for admitting air to the housing 414 or outlet 415 in order to fluidize the particles therein, or at least to assist the flow of such particles in the required direction.

The receiver 418 may extend completely around the upper end of the drum 410, in which case the shield 417 would be omitted.

It will be evident that as in the arrangement shown in FIG. 6 the finned tubes are situated outside the bed, the bed depth can be reduced without affecting the rate of heat transfer between the particles and the finned tubes. The area of the effective heat transfer surface of the finned tubes is not limited by the dimensions of the drum and the bed depth. In order to avoid moderately large pressure drops through the bed, bed depths of the order of 1 inch can be employed, and bed depths of the order of ½ inch may be satisfactory in certain cases.

The modification of the heat exchanger of FIG. 1 which is illustrated in FIG. 3, and the heat exchanger shown in FIGS. 4 and 5 both have the advantage that the ribs which constitute the distributor means are in thermal communication through the fins with the tubes which contain liquid coolant in a case where the heat exchanger is used to transfer heat from a hot gas to a liquid. Thus, gas at very high temperatures can safety be passed through the distributor means without risk of overheating and distorting same.

The structure illustrated in FIGS. 4 and 5 is well adapted to withstand the centrifugal stresses imposed by rotation. Furthermore, the drum can be constructed in a simple manner by forming the fins with integral ribs as stampings of a material having a high thermal conductivity, for example aluminium or copper, and passing the tubes through respective openings in the fins. Spacer shims of appropriate thickness, say 8/1000 of an inch, would be positioned between adjacent ribs at intervals of say 2 inches around the circumference of the drum, and the components of the drum then united by brazing or otherwise.

A further advantage of the construction shown in FIGS. 4 and 5 and the modification shown in FIG. 3 is that there are no gaps between the fins and distributor means. In the constructions shown in FIGS. 1 and 2, lateral migration of particles can occur from a vertical space between one pair of adjacent fins to another such vertical space through the gaps between the lower edges of the fins and the distributor plate. Even if the fins were positioned close to the distributor plate, some lateral migration would still occur. If such lateral migration is prevented, temperature differences between one part of the bed and another can be more easily established and maintained.

In all examples of heat exchangers in accordance with the present invention, it is preferred that the fin spacing should be no closer than five times the maximum size of particles in the bed. Preferably the fins are arranged to increase the effective surface area of the tubes by an amount such that an unfinned tube of the same effective surface area would have a diameter in the range four to twenty times the diameter of the finned tube employed. It is considered that the tube diameters should be not greater than 1 inch, and tubes of smaller diameter down to capillary tubes may be employed. The heat transfer duty of which a particular heat exchanger is capable may be varied by adding particles to or removing particles from the bed. For example, particles may be removed from a bed in order to expose a part of the fins and thereby reduce the effective surface area of the finned tubes.

It will be understood that the particular embodiments herein described may be modified without departing from the scope of the present invention. For example, the heat exchangers herein described may be modified to provide for heat transfer between a particulate solid material and a fluid. In this case, the heat exchanger would be so arranged that the particulate solid material was delivered to the bed and removed after passing across the bed. The fluidizing gas would be recirculated through the bed, with its function being merely to fluidize the particles and not to remove heat from or supply heat to the particles. The fluid with which heat is to be exchanged would be passed through the finned tubes which are immersed in the bed.

In many cases it will be desirable for cheapness to use extended surface tubing manufactured by existing techniques such as integral circular fin rolled tubes, welded fin tubes or studded tubes, but in general the design of the fins will differ from existing designs of extended surfaces because of the very high heat transfer fluxes involved. Thus, the fins will, for preference, be thicker than their standard counterparts designed for convective heat transfer situations.

I claim:

1. A. fluidized bed heat exchanger comprising:
a quantity of solid particles,
distributor means for supporting a bed of said particles, for admitting a gas thereto and for distributing the gas throughout the bed,
and at least one tube having a portion defining an extended heat transfer surface, said portion being immersed in the particles,
wherein the depth of the bed measured from a surface of the bed in contact with the distributor means to an opposite surface, is not greater than 6 inches.

2. The heat exchanger according to claim 1 wherein there is a plurality of extended surface tubes arranged in two layers within the bed, and the bed depth is not greater than 4 inches.

3. The heat exchanger according to claim 1 wherein there is a single layer of extended surface tubes disposed within the bed, and the bed depth is not greater than 2 inches.

4. The heat exchanger according to claim 1 wherein there is a single extended surface tube disposed within the bed, and the bed depth is not greater than 2 inches.

5. The heat exchanger according to claim 1 wherein there is a plurality of extended surface tubes disposed within the bed, and said tubes are arranged closer to one another in one part of the bed than in a further part of the bed.

6. The heat exchanger according to claim 1 wherein the extended surface tube is provided with a plurality of fins which are so arranged that the spacing between adjacent fins varies along the length of the tube.

7. The heat exchanger according to claim 1 wherein said distributor means is in the form of a drum, bearing means is provided for supporting the distributor means for rotation about an axis of said drum, drive means is provided for rotating the distributor means about said axis, and the bed of solid particles is supported, at least when the distributor means is rotating, on a radially inwardly presented face of the distributor means.

8. The heat exchanger according to claim 7 wherein said extended surface tube is mounted within the drum.

9. The heat exchanger according to claim 7 wherein said extended surface tube is mounted outside the drum, and circulation means is provided for circulating particles from the drum over the tube and back to the drum.

10. The heat exchanger according to claim 9 wherein the drum is formed with an outlet opening at one end for permitting particles to leave the drum, said circulation means comprises a receiver for receiving particles from the drum outlet opening, and a housing containing said tube and communicating with the receiver, the housing being provided with an outlet for delivering particles from the housing into the drum at an end thereof remote from the drum outlet opening.

11. The heat exchanger according to claim 7 wherein the bed depth is not greater than 1 inch.

12. The heat exchanger according to claim 8 wherein a plurality of finned tubes is provided within the drum, the tubes extend parallel to the axis of rotation of the drum, and the fins of the tubes are perpendicular to the axis of rotation.

13. The heat exchanger according to claim 12 wherein the fins are of annular shape, each fin embracing each of said tubes.

14. A heat exchanger according to claim 1 wherein the spacing between said tube and the distributor means is less than half the depth of the bed.

15. A heat exchanger according to claim 2 wherein the lower of said two layers is less than 2 inches from an interface between the distributor means and the bed.

16. A heat exchanger according to claim 1 wherein said layer is spaced less than 1 inch from an interface between the distributor means and the bed.

17. A fluidized bed heat exchanger comprising: a quantity of solid particles, a distributor means for supporting a bed of said particles for admitting a gas thereto and for distributing the gas throughout the bed, and at least one tube having a portion defining an extended heat transfer surface, said portion being immersed in the particles, wherein the depth of the bed measured from a surface of the bed in contact with the distributor means to an opposite surface, is not greater than 6 inches, said extended heat transfer surface comprising a plurality of fins, and said distributor means being integral with the fins.

18. The heat exchanger according to claim 17 wherein said distributor means is constituted by ribs formed on the fins along margins thereof, and openings through which gas can enter the bed of solid particles are defined between adjacent ribs.

* * * * *

UNITED STATES PATENT OFFICE
CERTIFICATE OF CORRECTION

PATENT NO. : 3,912,002
DATED : October 14, 1975
INVENTOR(S) : Douglas E. Elliott It is certified that error appears in the above-identified patent and that said Letters Patent are hereby corrected as shown below:

[30] Foreign Priority Data:
Great Britain No. 47762/71 filed October 14, 1971

*Signed and Sealed this*

*thirtieth* Day of *December 1975*

[SEAL]

Attest:

RUTH C. MASON
*Attesting Officer*

C. MARSHALL DANN
*Commissioner of Patents and Trademarks*